US012468381B1

(12) United States Patent
Kajtár et al.

(10) Patent No.: US 12,468,381 B1
(45) Date of Patent: Nov. 11, 2025

(54) DYNAMIC INTERACTION ZONE SYSTEM FOR ACCURATE 3D BUTTON SELECTION IN AUGMENTED REALITY ENVIRONMENTS

(71) Applicant: Snap Inc., Santa Monica, CA (US)

(72) Inventors: Márton Gergely Kajtár, Vienna (AT); Neken Aritia Symphonie Razafindrabe, Lachen (CH); Andras Sziffer, Vienna (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/827,376

(22) Filed: Sep. 6, 2024

(51) Int. Cl.
*G06F 3/01* (2006.01)
*G02B 27/01* (2006.01)
*G06V 40/10* (2022.01)
*G06V 40/20* (2022.01)

(52) U.S. Cl.
CPC .......... *G06F 3/011* (2013.01); *G02B 27/0101* (2013.01); *G02B 27/017* (2013.01); *G06F 3/017* (2013.01); *G06V 40/10* (2022.01); *G06V 40/28* (2022.01); *G02B 2027/0138* (2013.01); *G02B 2027/014* (2013.01)

(58) Field of Classification Search
CPC ..... G06F 3/011; G06F 3/017; G02B 27/0101; G02B 27/017; G02B 2027/0138; G02B 2027/014; G06V 40/10; G06V 40/28
See application file for complete search history.

(56) References Cited

U.S. PATENT DOCUMENTS

| | | | | |
|---|---|---|---|---|
| 2014/0201690 A1* | 7/2014 | Holz | ................... | G06F 3/04817 |
| | | | | 715/863 |
| 2015/0363070 A1* | 12/2015 | Katz | ................... | G06F 3/04815 |
| | | | | 715/852 |
| 2016/0018985 A1* | 1/2016 | Bennet | ................... | G09G 3/002 |
| | | | | 345/175 |
| 2017/0192617 A1* | 7/2017 | Barth | ..................... | G06F 3/0425 |
| 2018/0157398 A1* | 6/2018 | Kaehler | ............... | G06V 10/464 |
| 2020/0218349 A1* | 7/2020 | Chu | ......................... | G06F 3/011 |
| 2024/0265683 A1* | 8/2024 | Kim | .......................... | G06F 3/01 |

* cited by examiner

*Primary Examiner* — Stephen G Sherman
(74) *Attorney, Agent, or Firm* — Schwegman Lundberg & Woessner, P.A.

(57) ABSTRACT

A head-wearable apparatus improves user interactions with virtual interface elements in augmented reality (AR) environments. The apparatus tracks hand movements in 3D space, calculating velocity vectors and positions of fingers. For each virtual interface element, it determines a UI-to-finger vector and calculates alignment with the finger's velocity vector. Interaction zones are dynamically adjusted based on this alignment and velocity magnitude. The system evaluates consistency between finger movement and element locations to predict intended targets. Interactions are triggered when fingers enter adjusted zones of predicted targets. This approach reduces erroneous selections and improves interaction accuracy, even for closely-spaced elements. The invention applies to various AR scenarios, enhancing user experiences in applications like gaming and education.

20 Claims, 6 Drawing Sheets

US 12,468,381 B1

DYNAMIC INTERACTION ZONE SYSTEM FOR ACCURATE 3D BUTTON SELECTION IN AUGMENTED REALITY ENVIRONMENTS

TECHNICAL FIELD

The present invention relates generally to user interface technologies in augmented reality (AR) environments, and more particularly to systems and methods for improving the accuracy and reliability of user interactions with virtual interface elements in three-dimensional (3D) space. Specifically, the invention pertains to dynamic and intelligent user interface elements that adapt their interaction zones based on user behavior and movement patterns to enhance button selection and interaction in AR applications.

BACKGROUND

Augmented reality (AR) systems have emerged as a powerful technology for overlaying digital content onto the physical world, creating immersive and interactive experiences for users. These systems typically employ head-mounted displays or smart glasses that allow users to view both their real-world surroundings and computer-generated imagery (e.g., virtual elements) simultaneously. As AR technology has advanced, so too have the methods for user interaction within these augmented environments.

Virtual interfaces play a crucial role in AR systems, providing users with intuitive means to interact with digital content and control various aspects of their augmented experience. These interfaces often take the form of floating panels, buttons, sliders, and other familiar user interface (UI) elements that appear to exist within the three-dimensional space around the user. Unlike traditional two-dimensional interfaces on screens or touchpads, AR virtual interfaces can be positioned and manipulated in 3D space, offering new possibilities for user interaction.

BRIEF DESCRIPTION OF THE DRAWINGS

In the drawings, which are not necessarily drawn to scale, like numerals may describe similar components in different views. To easily identify the discussion of any particular element or operation, the most significant digit or digits in a reference number refer to the figure number in which that element is first introduced. Some non-limiting examples are illustrated in the figures of the accompanying drawings in which.

DETAILED DESCRIPTION

The present disclosure relates to techniques for improving user interactions with virtual interface elements in augmented reality (AR) environments. The following detailed description is presented to enable any person skilled in the art to make and use the disclosed embodiments. For purposes of explanation, specific details are set forth to provide a thorough understanding of the present embodiments. However, it will be apparent to one skilled in the art that the present embodiments may be practiced without these specific details.

AR systems have emerged as a powerful technology for overlaying digital content onto the physical world, creating immersive and interactive experiences for users. However, accurately detecting and interpreting user interactions with virtual interface elements in three-dimensional (3D) space presents significant technical challenges. Conventional AR systems often rely on simple position-based detection methods, which can lead to erroneous selections and unintended interactions, especially when virtual elements are in close proximity to each other. These issues are exacerbated by factors such as the lack of physical feedback in AR interactions, limitations in sensor accuracy, and the inherent complexity of tracking user movements in 3D space.

The present disclosure addresses these technical challenges by introducing a novel approach to user interaction in AR environments. This approach employs a sophisticated system that considers multiple factors beyond simple position-based detection, including the velocity vector of the user's finger movement, the alignment between the finger's trajectory and the direction to virtual interface elements, and the temporal aspects of the interaction. By dynamically adjusting the interaction zones of virtual interface elements based on these factors, the system significantly improves the accuracy and reliability of user interactions in 3D space.

This innovative solution offers several key technical benefits. It reduces the likelihood of erroneous selections, even when virtual elements are closely spaced, by intelligently resizing interaction zones based on the user's movement patterns and intent. The system's ability to distinguish between slow, deliberate movements and faster, more decisive ones allows for more intuitive and accurate interactions. Furthermore, by implementing smoothing and clamping techniques, the system maintains consistent interaction even with slight movements or tracking inaccuracies. These advancements collectively enhance the user experience in AR applications, making interactions more precise, responsive, and natural.

Figure 1:
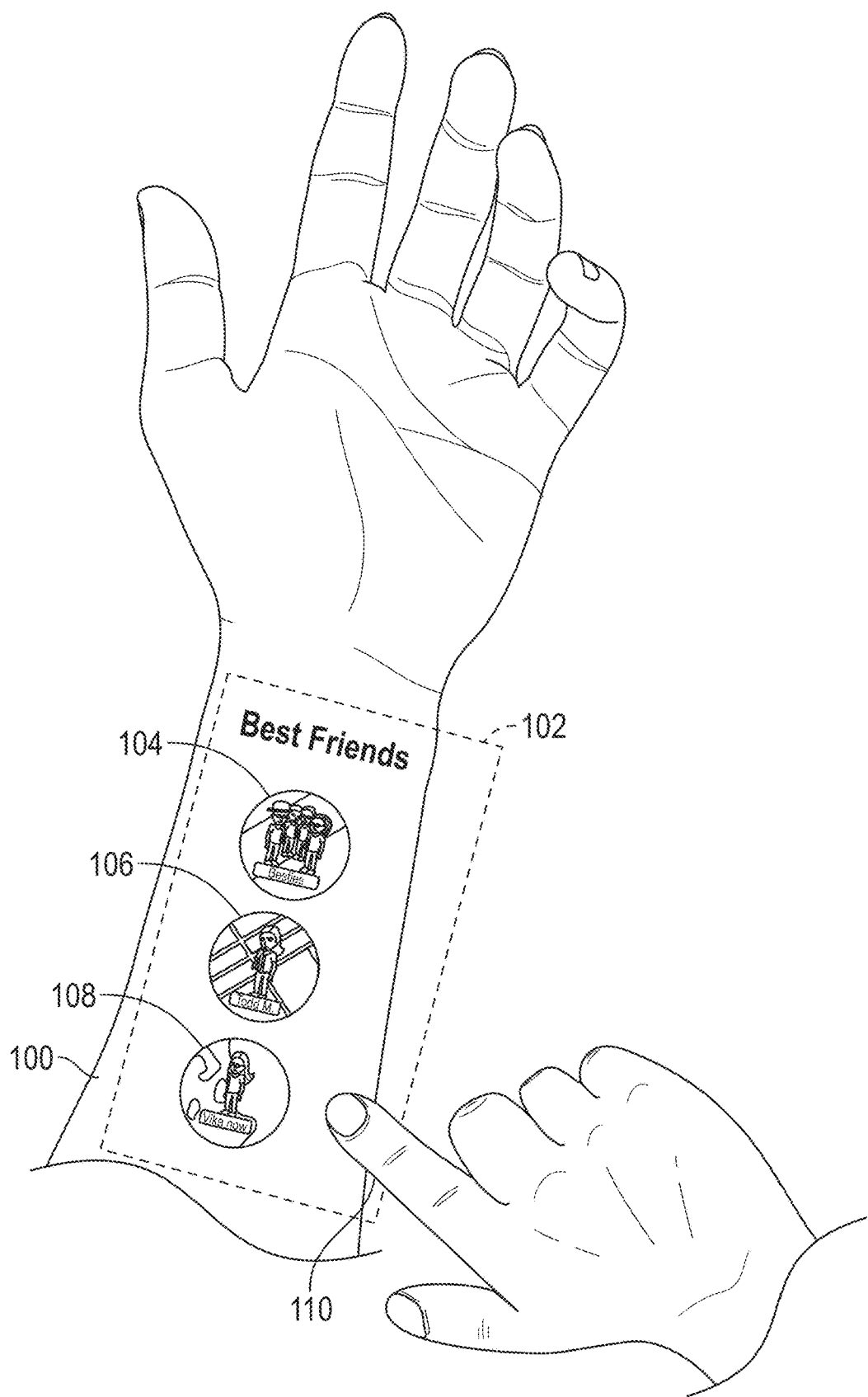
FIG. 1 is a diagram illustrating the view of a user wearing an AR device of a hand with an extended pointer finger, interacting with virtual interface elements displayed by the AR device to appear as if fixed to a forearm, consistent with some embodiments.

FIG. 1 illustrates an example view of a user who is wearing an AR device, showing a user interface 102 of a friend feed that is displayed in AR or 3D space, anchored to the forearm 100 of a user. The user interface 102 includes interactive buttons 104, 106, and 108, which, when selected, may invoke additional functionality, such as allowing the user to interact with one or more other persons represented by the visual interface elements. To invoke this functionality, the user must use their other hand (e.g., the right hand 110)

to make a selection of one of the visual interface elements as presented on his or her forearm.

Figure 2:
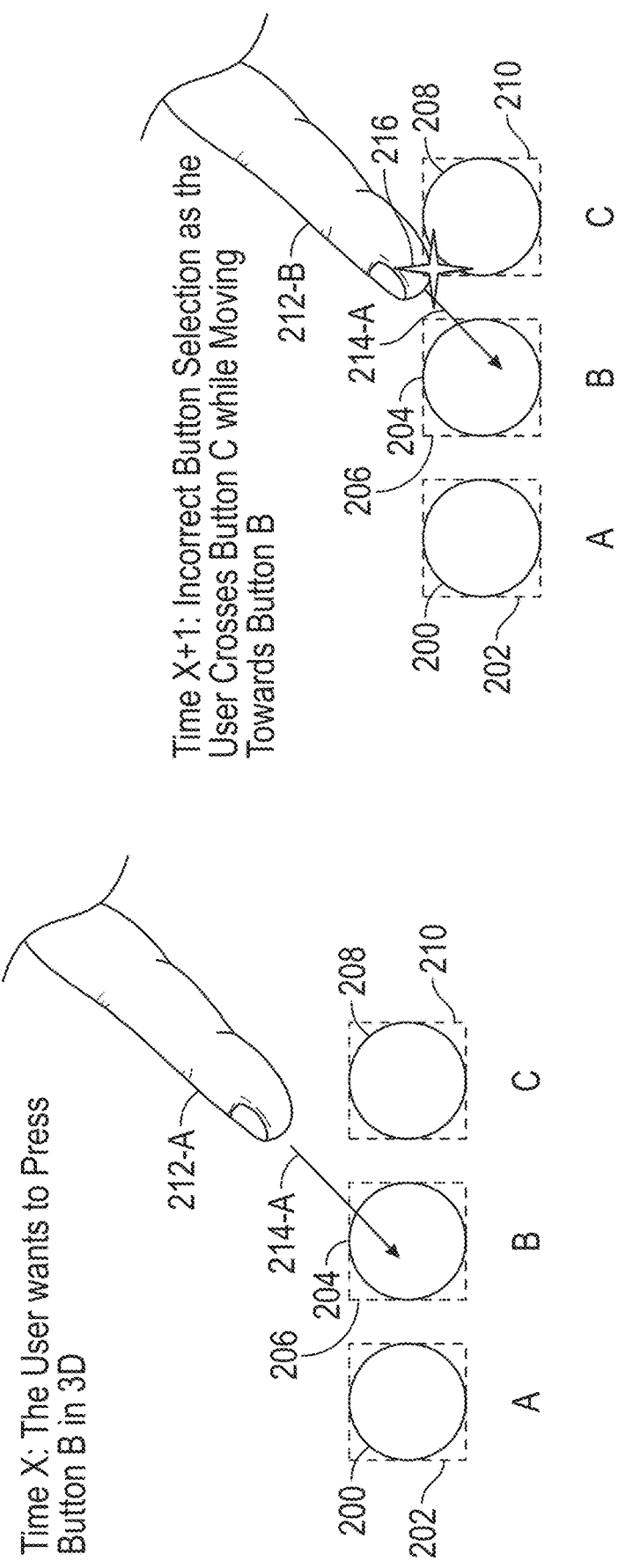
FIG. 2 is a diagram depicting a scenario, at two different points in time, of a user attempting to press a virtual button in 3D space, illustrating potential challenges in accurately detecting user intent.

FIG. 2 illustrates a technical problem that can occur when a user is interacting with virtual interface elements in 3D space. A set of virtual interface elements (e.g., buttons) is shown at two points in time. On the left, at Time=X, three buttons are shown: button A, button B, and button C. Each button comprises a visual component that is visible to the user, represented by the circles with reference numbers 200, 204, and 208. In addition to a visual component, each virtual interface element also includes an interaction zone, represented by the squares surrounding each circle, with reference numbers 202, 206, and 210.

An interaction zone is a region in 3D space associated with each virtual interface element that determines when a user's input (e.g., a finger position) is interpreted as interacting with that virtual element. The interaction zone may have a different shape than the visual component of the virtual interface element. It can be smaller, larger, or the same size as the visual element. The interaction zone differs from the visual component in that it is not visible to the user but instead defines the area in which the AR device detects and processes user interactions (e.g., a button push or selection). With conventional AR devices, the detection method is primarily a function of the position of the hand or finger relative to any one interaction zone at a single point in time. This approach does not take into account the user's intent or the trajectory of their movement, leading to potential errors in interaction detection.

As shown in FIG. 2, a user is attempting to select the middle of the three buttons, button B. However, at Time=X+1, the user's finger (represented at this time as 212-B) is positioned such that it is detected as being in the location of the interaction zone 210 of button C, as indicated by the indicator with reference number 216. This early detection results in an erroneous selection of button C, despite the user's intent to select button B.

This problem occurs primarily as a result of the way the AR device processes the imagery captured by its cameras. In conventional AR systems, the detection of user interactions is often based solely on the position of the user's finger in 3D space at a given moment. This approach does not take into account the user's intent or the trajectory of their movement. As a result, when a user moves their finger towards a target button, the system may incorrectly interpret the interaction if the finger passes through the interaction zone of another button along the way.

The technical nature of this problem stems from the challenges of accurately tracking and interpreting user movements in 3D space. Factors such as the speed of the finger movement, the proximity of virtual elements to each other, and the limitations of the AR device's sensors and processing capabilities all contribute to the difficulty of correctly identifying the user's intended target. Additionally, the lack of physical feedback in AR interactions makes it challenging for users to precisely control their movements, further exacerbating the problem of unintended selections.

Furthermore, the problem is compounded by the fact that traditional AR devices often use simple heuristics-based approaches for detecting button selection, which can lead to unintended button taps and a less accurate user experience. These systems typically do not consider the behavior or intent of the user's movement, instead relying solely on the position of the finger at a given moment.

The present disclosure addresses technical challenges in virtual interface element interaction in AR environments by introducing a novel approach that considers multiple factors beyond simple position-based detection. The techniques set forth herein take into account not only the position of the user's hand or finger but also the velocity vector of the finger movement, the alignment between the hand or finger's trajectory and the direction to the virtual interface element, and other factors to more accurately predict the user's intended interaction target. Furthermore, by dynamically adjusting the interaction zones of virtual interface elements based on the user's hand movement and intent, this approach significantly improves the accuracy and reliability of user interactions in 3D space. The system tracks the velocity vector of the user's finger and calculates its alignment with the direction vector between the finger and each virtual interface element. By evaluating the consistency between the finger's velocity vector and the relative locations of the virtual elements, the system can more accurately predict the user's intended target. This approach offers several key technical benefits and advantages.

Improved accuracy is achieved by considering both the position and movement of the user's hand or finger, significantly reducing the likelihood of erroneous selections, especially when virtual elements are in close proximity. The size of each element's interaction zone is dynamically adjusted based on the calculated alignment and velocity magnitude of the user's finger movement. In some examples, interaction zones may decrease in size for virtual interface elements with low alignment between the finger's velocity vector and the direction to the element, or for those not in the path of the finger's movement. This reduction in size helps minimize the likelihood of unintended selections. Alternatively, only the target interaction zone may increase in size, allowing for more forgiving and precise interactions as the user approaches the intended target, while keeping other interaction zones small or unchanged.

The dynamic adjustment of interaction zones can be implemented in various ways. For instance, in some embodiments, all interaction zones may start small and expand or contract based on the ongoing analysis of the finger's trajectory and speed. In other implementations, only the most likely target element's interaction zone may grow, while others remain constant. The specific behavior can be tailored to the needs of the application and user preferences, providing flexibility in how the system interprets user intent in 3D space.

In some examples, the system takes into account the temporal aspect of interaction by considering the speed and consistency of the user's movement, distinguishing between slow, deliberate actions and faster, more decisive ones. By implementing smoothing and clamping of velocity vectors, the system maintains consistent interaction even with slight movements or tracking inaccuracies. Smoothing refers to the process of reducing noise in the velocity data by applying a filter that averages out rapid fluctuations, resulting in a more stable and consistent representation of the finger's movement. Clamping involves setting upper and lower limits on the velocity values, preventing extreme or unrealistic readings from affecting the interaction. These techniques help to filter out unintended micro-movements and tracking errors, ensuring that the system responds more accurately to the user's intended gestures, whether they are slow and precise or quick and decisive.

Furthermore, this approach can be extended beyond traditional user interface elements to work with a wide range of virtual objects in 3D space, enhancing its applicability across different AR scenarios. By more accurately interpreting user intent, the system reduces frustration and improves the overall intuitiveness of AR interactions. In video games, this technology could be used to improve player interactions with virtual game objects, such as weapons, tools, or interactive elements in the game environment. For example, in a first-person shooter game, the system could more accurately predict which weapon a player intends to select from their virtual inventory, even if the weapons are closely spaced in the AR interface. In educational applications, this approach could enhance interactive learning experiences by allowing students to manipulate virtual 3D models more intuitively. For instance, in a virtual chemistry lab, students could more easily select and interact with specific atoms or molecules when building complex structures, with the system accurately interpreting their intended selections even in densely populated virtual spaces. By more accurately interpreting user intent across these diverse applications, the system reduces frustration and improves the overall intuitiveness of AR interactions, leading to more engaging and effective gaming and learning experiences.

In some examples, the dynamic interaction system described herein can be further leveraged to provide a tradeoff between hand tracking precision and interaction complexity. In contexts where high precision hand tracking is available, the system can translate this increased precision into more refined and diverse interaction capabilities. For example, the dynamic behavior of the virtual interface elements can be adjusted not only to reduce ambiguity in user movements but also to enable more precise targeting of smaller or more numerous interactable elements. This allows the system to exploit highly precise and refined user movements, enabling a wider variety of effects and interactions. The interaction zones can be dynamically resized to be smaller for more precise interactions when high-quality hand tracking data is available, or larger to accommodate less precise tracking or user movements. This adaptive approach enables the system to maintain robust interactions across a spectrum of tracking precision and user movement types, from broad gestures to minute, controlled movements. Other aspects and advantages of the various embodiments of the present invention will be readily apparent from the description of the several figures that follows.

Figure 3:
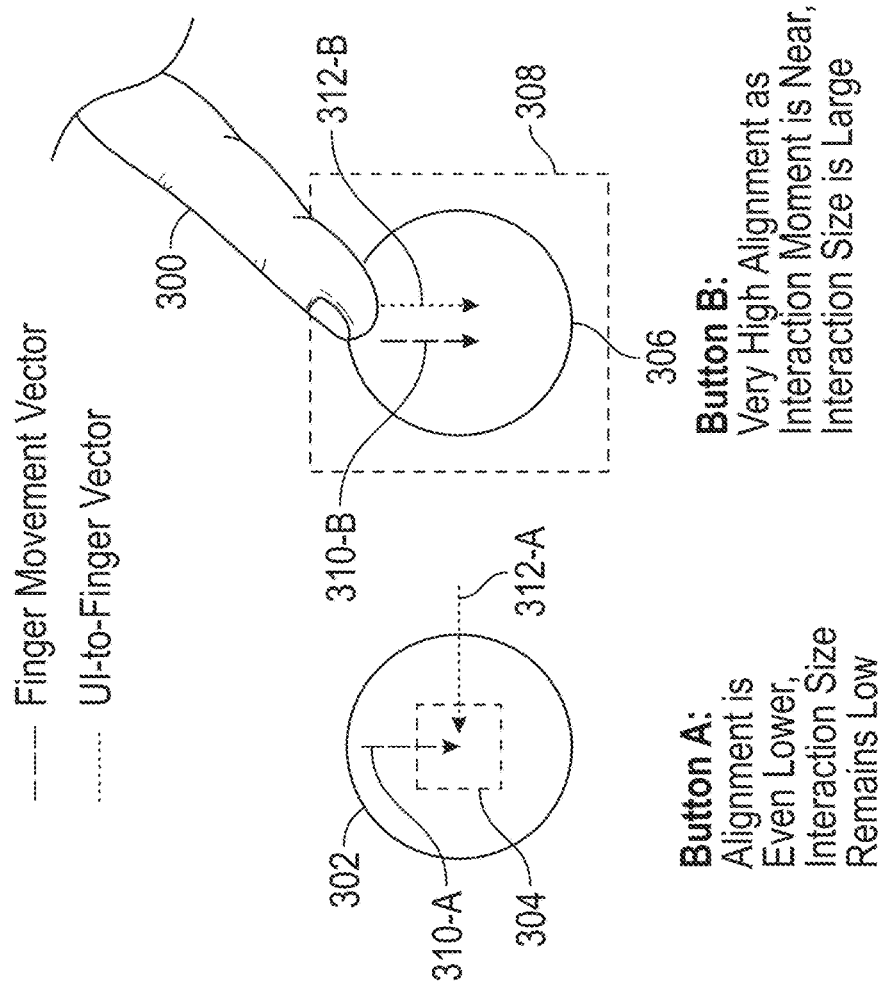
FIG. 3 is a diagram showing a comparison between two virtual buttons with different interaction characteristics based on finger velocity and alignment, consistent with some embodiments.
Figure 3:
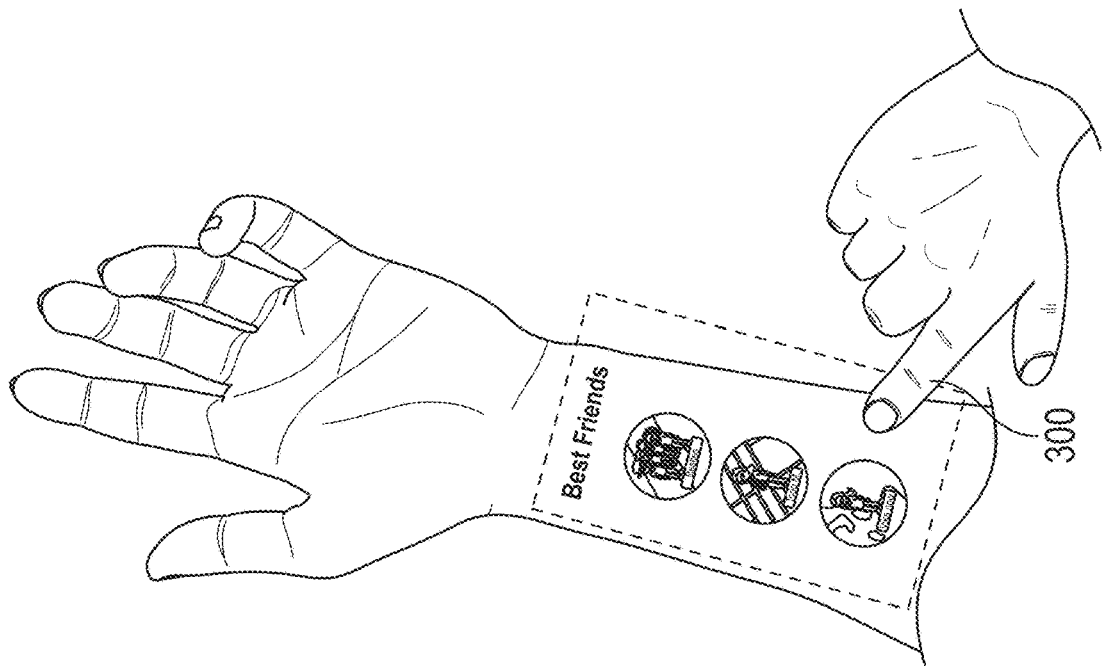

FIG. 3 illustrates the novel approach to virtual interface element interaction in AR environments, demonstrating how the system considers multiple factors to accurately predict the user's intended interaction target.

The left side of FIG. 3 shows a simplified version of the AR user interface from FIG. 1, with the user's finger (300) approaching the virtual buttons displayed on the palm. This representation provides context for the detailed analysis shown on the right side of the figure.

The right side of FIG. 3 provides a detailed view of how the AR device analyzes the user's finger movement and its relationship to two virtual buttons, labeled as button A and button B. Each button is represented by a circle (302, 306) surrounded by a square (304, 308), which denotes the button's interaction zone. The interaction zones are dynamically adjusted based on the system's analysis of the user's intent.

The AR device tracks two key vectors for each button: the velocity of the finger (represented by yellow arrows 310-A and 310-B) and the UI-to-Finger direction (represented by red arrows 312-A and 312-B). The velocity vector indicates the speed and direction of the finger's movement, while the UI-to-Finger direction vector points from the center of each button towards the finger's current position.

To calculate these vectors, the AR device uses its cameras and sensors to capture the position and movement of the user's finger in 3D space. The device's processors then analyze this data in real-time, applying smoothing and clamping techniques to reduce noise and ensure consistent tracking even with slight movements or tracking inaccuracies.

For button A, the illustration shows that the alignment between the velocity vector (310-A) and the UI-to-Finger direction vector (312-A) is low. This misalignment indicates that the user is likely not intending to interact with button A. Consequently, the interaction size for button A remains small, as indicated by the compact square (304) surrounding the button.

In contrast, button B demonstrates a high alignment between its velocity vector (310-B) and UI-to-Finger direction vector (312-B). This alignment suggests that the user is likely targeting button B for interaction. As a result, the interaction zone for button B, represented by the square (308), is significantly larger than that of button A.

The AR device continuously updates these calculations as the user's finger moves, ensuring that the interaction zones are always reflective of the current movement and intent. This dynamic adjustment occurs in real-time, with the interaction zones expanding or contracting based on the ongoing analysis of the finger's trajectory and speed.

The system also considers the temporal aspect of the interaction, distinguishing between slow, deliberate movements and faster, more decisive ones. This allows the AR device to adapt its response based on the user's behavior, providing a more intuitive and accurate interaction experience.

By implementing this approach, the AR device addresses the challenges presented in FIG. 2, where traditional systems might incorrectly interpret a user's interaction based solely on position. The dynamic adjustment of interaction zones based on multiple factors significantly reduces the likelihood of erroneous selections while still allowing for precise interactions, even when virtual elements are in close proximity.

FIG. 3 is a diagram showing a comparison between two virtual buttons with different interaction characteristics based on finger velocity and alignment, consistent with some embodiments. The left side of FIG. 3 shows a simplified version of the AR user interface from FIG. 1, with a user's finger 300 approaching the virtual buttons displayed on the forearm of the user. This representation provides context for the detailed analysis shown on the right side of the figure.

The right side of FIG. 3 provides a detailed view of how the AR device analyzes the user's finger movement and its relationship to two virtual interface elements (buttons), labeled as button A and button B. Each button has a visual component, represented by a circle 302 and 306, surrounded by a square 304 and 308, which denotes the button's interaction zone. As shown in FIG. 3, the interaction zone 304 for button A is smaller in size than the interaction zone 308, for button B. As discussed further below, the size of the interaction zones are dynamically adjusted based on the system's analysis of the user's intent.

The AR device tracks two key vectors for each button: a finger movement vector (represented by arrows 310-A and 310-B) and a UI-to-finger vector (represented by arrows 312-A and 312-B). The finger movement vector, or finger velocity vector, indicates the speed and direction of the finger's movement, while the UI-to-finger vector represents the distance and direction from some portion of each button (e.g., the center) towards the current position of the finger.

To calculate these vectors, the AR device uses its cameras and sensors to capture the position and movement of the user's finger in 3D space. The AR device determines the two key vectors—the velocity of the finger and the UI-to-finger direction-through a sophisticated process of image analysis and spatial tracking. The device's visible light camera(s) 406 and infrared camera(s) 410 capture multiple images of the user's hand and fingers over time. These images are then processed by the image processor 422 and the high-speed processor 430 to perform landmark detection on the hand, identifying key points such as fingertips, joints, and the palm.

To calculate the finger movement vector of the finger, the system analyzes the change in position of the fingertip landmark across multiple frames. This temporal analysis allows the device to determine both the speed and direction of the finger's movement. The UI-to-finger vector is computed by calculating the vector from the center of each virtual button to the current position of the fingertip landmark.

Importantly, the AR device takes into account any movement of the head-wearable apparatus itself. The motion and position components 530, 534 of the I/O components 508 track the device's movement in 3D space. This information is used to adjust the perceived positions of virtual objects and the user's hand, ensuring that the calculated vectors remain accurate even if the user's head moves during interaction.

The system applies smoothing and clamping techniques to the velocity data to reduce noise and ensure consistent tracking. This involves using filters to average out rapid fluctuations and setting upper and lower limits on velocity values. These techniques help to filter out unintended micromovements and tracking errors, providing a more stable and accurate representation of the user's intended gestures.

By continuously updating these calculations and adjusting for device movement, the AR system can maintain accurate tracking of the finger's velocity and direction relative to virtual interface elements, even in dynamic 3D environments.

The AR device determines the alignment of the two vectors for each visual interface element through a combination of vector analysis and geometric calculations. For instance, consistent with some examples, for each button, the system calculates the dot product of the normalized finger movement vector and the normalized UI-to-finger vector. This dot product provides a scalar value between −1 and 1, where 1 indicates perfect alignment, 0 indicates perpendicular vectors, and −1 indicates opposite directions. The system then uses this alignment value to adjust the interaction zone size. Additionally, the magnitude of the finger movement vector is considered, with faster movements given more weight in the alignment calculation. The AR device may also employ a weighted sum of multiple factors, including the dot product, velocity magnitude, and distance to the button, to determine a final alignment score. This score is then used to dynamically adjust the interaction zone size, with higher scores resulting in larger interaction zones.

For button A, the illustration in FIG. 3 shows that the alignment between the finger movement vector 310-A and the UI-to-finger vector 312-A is low. This misalignment indicates that the user is likely not intending to interact with button A. Consequently, the interaction size for button A remains small, as indicated by the compact square 304 enclosed by the visible component (e.g. circle 302) of the button.

In contrast, button B demonstrates a high alignment between its finger movement vector 310-B and UI-to-finger vector 312-B. This alignment suggests that the user is likely targeting button B for interaction. As a result, the interaction zone for button B, represented by the square (308), is significantly larger than that of button A.

The AR device continuously updates these calculations as the user's finger moves, ensuring that the interaction zones are always reflective of the current movement and intent. This dynamic adjustment occurs in real-time, with the interaction zones expanding or contracting based on the ongoing analysis of the finger's trajectory and speed.

The system also considers the temporal aspect of the interaction, distinguishing between slow, deliberate movements and faster, more decisive ones. For slow movements, the system may require a higher degree of alignment between the finger movement vector and the UI-to-finger vector before expanding the interaction zone. Conversely, for faster movements, the system may be more lenient in its alignment requirements, recognizing that users are more likely to make decisive selections when moving quickly. The AR device also considers the consistency of the movement, looking for sustained directional intent rather than brief, erratic motions. This temporal analysis allows the system to differentiate between exploratory hand movements and intentional selection gestures, further improving the accuracy of user interactions. This allows the AR device to adapt its response based on the user's behavior, providing a more intuitive and accurate interaction experience.

By implementing this approach, the AR device addresses the challenges presented in FIG. 2, where traditional systems might incorrectly interpret a user's interaction based solely on position. The dynamic adjustment of interaction zones based on multiple factors significantly reduces the likelihood of erroneous selections while still allowing for precise interactions, even when virtual elements are in close proximity.

System with Head-Wearable Apparatus

Figure 4:
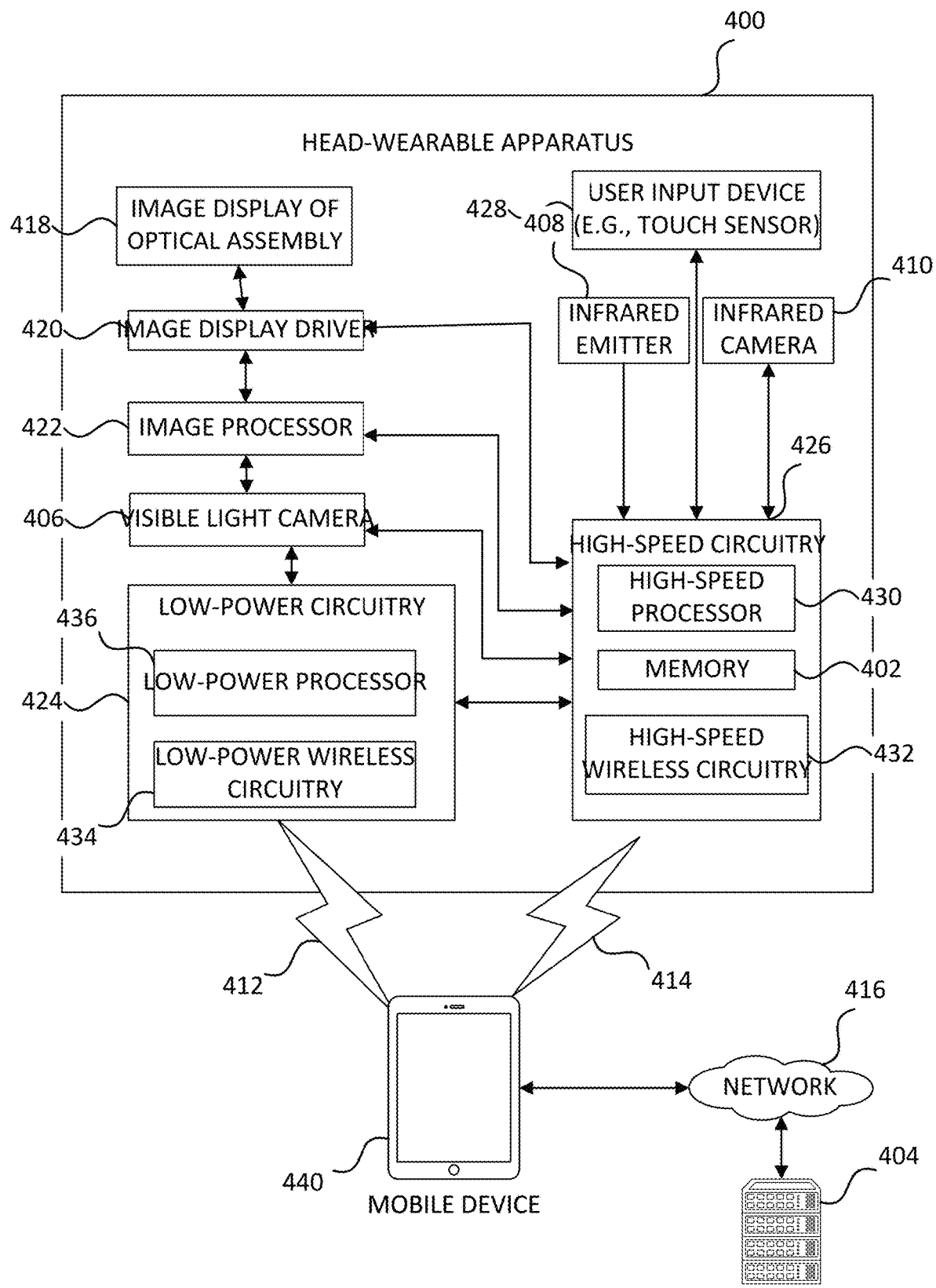
FIG. 4 is a block diagram showing the components of a head-wearable apparatus, including various sensors, processors, and communication interfaces, as well as its interaction with a mobile device and server system, consistent with some embodiments.

FIG. 4 is a high-level functional block diagram of an example head-wearable apparatus 400 communicatively coupled to a mobile device 440 and various server systems 404 via various networks 416.

The head-wearable apparatus 400 includes one or more cameras, each of which may be, for example, a visible light camera 406, an infrared emitter 408, and an infrared camera 410.

The mobile device 440 connects with head-wearable apparatus 400 using both a low-power wireless connection 412 and a high-speed wireless connection 414. The mobile device 440 is also connected to the server system 404 and the network 416.

The head-wearable apparatus 400 further includes two image displays of the image display of optical assembly 418. The two image displays of optical assembly 418 include one associated with the left lateral side and one associated with the right lateral side of the head-wearable apparatus 400. The head-wearable apparatus 400 also includes an image display driver 420, an image processor 422, low-power circuitry 424, and high-speed circuitry 426. The image display of optical assembly 418 is for presenting images and videos, including an image that can include a graphical user interface to a user of the head-wearable apparatus 400.

The image display driver 420 commands and controls the image display of optical assembly 418. The image display driver 420 may deliver image data directly to the image display of optical assembly 418 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 400 includes a frame and stems (or temples) extending from a lateral side of the frame. The head-wearable apparatus 400 further includes a user input device 428 (e.g., touch sensor or push button), including an input surface on the head-wearable apparatus 400. The user input device 428 (e.g., touch sensor or push button) is to receive from the user an input selection to manipulate the graphical user interface of the presented image.

The components shown in FIG. 4 for the head-wearable apparatus 400 are located on one or more circuit boards, for example a PCB or flexible PCB, in the rims or temples. Alternatively, or additionally, the depicted components can be located in the chunks, frames, hinges, or bridge of the head-wearable apparatus 400. Left and right visible light cameras 406 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 400 includes a memory 402, which stores instructions to perform a subset, or all the functions described herein. The memory 402 can also include storage device.

As shown in FIG. 4, the high-speed circuitry 426 includes a high-speed processor 430, a memory 402, and high-speed wireless circuitry 432. In some examples, the image display driver 420 is coupled to the high-speed circuitry 426 and operated by the high-speed processor 430 to drive the left and right image displays of the image display of optical assembly 418. The high-speed processor 430 may be any processor capable of managing high-speed communications and operation of any general computing system needed for the head-wearable apparatus 400. The high-speed processor 430 includes processing resources needed for managing high-speed data transfers on a high-speed wireless connection 414 to a wireless local area network (WLAN) using the high-speed wireless circuitry 432. In certain examples, the high-speed processor 430 executes an operating system such as a LINUX operating system or other such operating system of the head-wearable apparatus 100, and the operating system is stored in the memory 402 for execution. In addition to any other responsibilities, the high-speed processor 430 executing a software architecture for the head-wearable apparatus 100 is used to manage data transfers with high-speed wireless circuitry 432. In certain examples, the high-speed wireless circuitry 432 is configured to implement Institute of Electrical and Electronic Engineers (IEEE) 802.11 communication standards, also referred to herein as WI-FI®. In some examples, other high-speed communications standards may be implemented by the high-speed wireless circuitry 432.

The low-power wireless circuitry 434 and the high-speed wireless circuitry 432 of the head-wearable apparatus 100 can include short-range transceivers (e.g., Bluetooth™, Bluetooth LE, Zigbee, ANT+) and wireless wide, local, or wide area network transceivers (e.g., cellular or WI-FI®). Mobile device 440, including the transceivers communicating via the low-power wireless connection 412 and the high-speed wireless connection 414, may be implemented using details of the architecture of the head-wearable apparatus 400, as can other elements of the network 416.

The memory 402 includes any storage device capable of storing various data and applications, including, among other things, camera data generated by the left and right visible light cameras 406, the infrared camera 410, and the image processor 422, as well as images generated for display by the image display driver 420 on the image displays of the image display of optical assembly 418. While the memory 402 is shown as integrated with high-speed circuitry 426, in some examples, the memory 402 may be an independent standalone element of the head-wearable apparatus 400. In certain such examples, electrical routing lines may provide a connection through a chip that includes the high-speed processor 430 from the image processor 422 or the low-power processor 436 to the memory 402. In some examples, the high-speed processor 430 may manage addressing of the memory 402 such that the low-power processor 436 will boot the high-speed processor 430 any time that a read or write operation involving memory 402 is needed.

As shown in FIG. 4, the low-power processor 436 or high-speed processor 430 of the head-wearable apparatus 400 can be coupled to the camera (visible light camera 406, infrared emitter 404, or infrared camera 410), the image display driver 420, the user input device 428 (e.g., touch sensor or push button), and the memory 402.

The head-wearable apparatus 400 is connected to a host computer. For example, the head-wearable apparatus 400 is paired with the mobile device 440 via the high-speed wireless connection 414 or connected to the server system 404 via the network 416. The server system 404 may be one or more computing devices as part of a service or network computing system, for example, that includes a processor, a memory, and network communication interface to communicate over the network 416 with the mobile device 440 and the head-wearable apparatus 400.

The mobile device 440 includes a processor and a network communication interface coupled to the processor. The network communication interface allows for communication over the network 416, low-power wireless connection 412, or high-speed wireless connection 414. Mobile device 440 can further store at least portions of the instructions in the memory of the mobile device 440 memory to implement the functionality described herein.

Output components of the head-wearable apparatus 400 include visual components, such as a display such as a liquid crystal display (LCD), a plasma display panel (PDP), a light-emitting diode (LED) display, a projector, or a waveguide. The image displays of the optical assembly are driven by the image display driver 420. The output components of the head-wearable apparatus 400 further include acoustic components (e.g., speakers), haptic components (e.g., a vibratory motor), other signal generators, and so forth. The input components of the head-wearable apparatus 400, the mobile device 440, and server system 404, such as the user input device 428, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 400 may also include additional peripheral device elements. Such peripheral device elements may include sensors and display elements integrated with the head-wearable apparatus 400. For example, peripheral device elements may include any I/O components including output components, motion components, position components, or any other such elements described herein.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 412 and high-speed wireless connection 414 from the mobile device 400 via the low-power wireless circuitry 434 or high-speed wireless circuitry 432.

Machine Architecture

Figure 5:
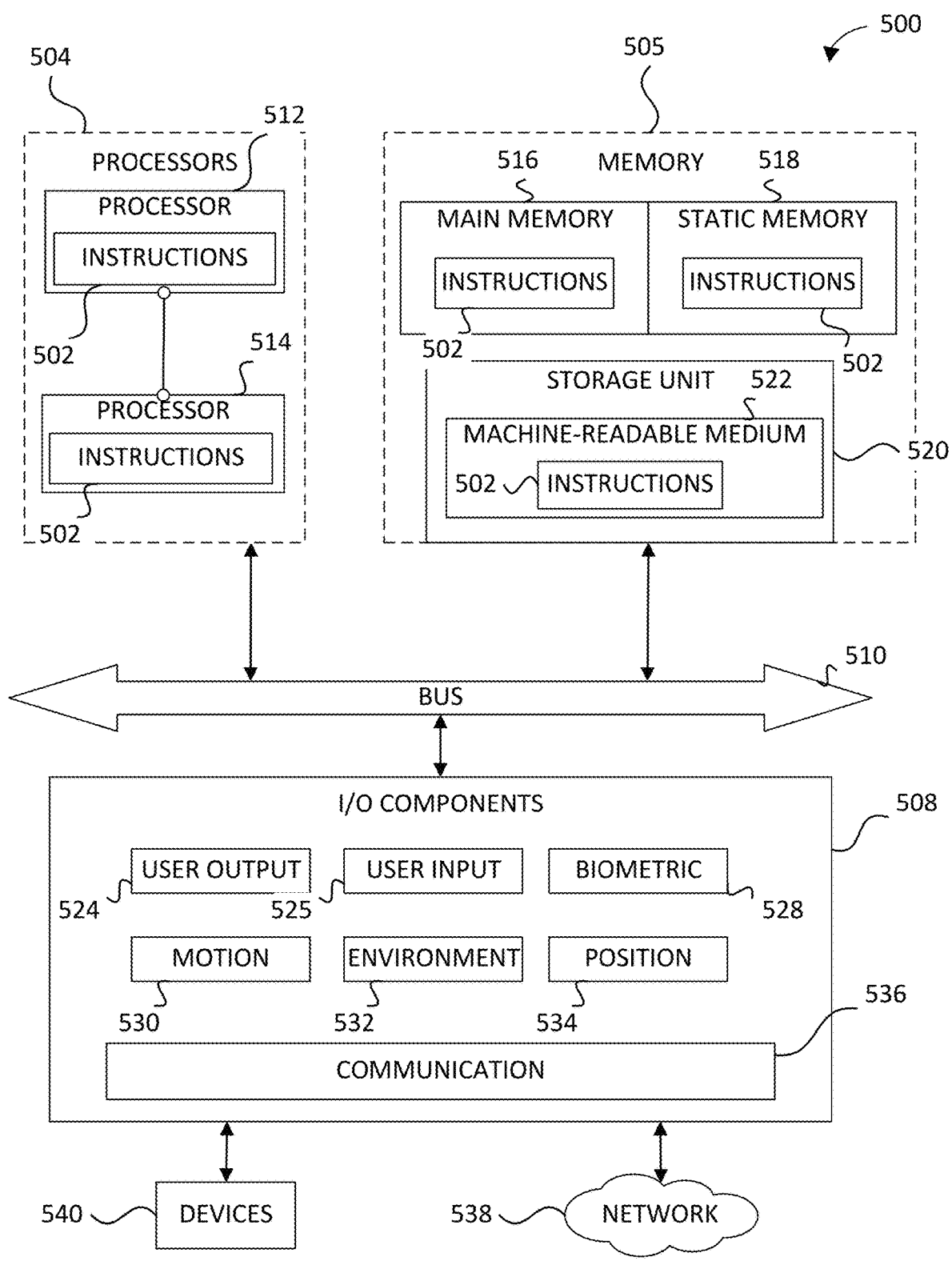
FIG. 5 is a block diagram illustrating the hardware architecture of a computing device, including processors, memory, storage, and I/O components, consistent with some embodiments.

FIG. 5 is a diagrammatic representation of the machine 500 within which instructions 502 (e.g., software, a program, an application, an applet, an app, or other executable code) for causing the machine 500 to perform any one or more of the methodologies discussed herein may be executed. For example, the instructions 502 may cause the machine 500 to execute any one or more of the methods described herein. The instructions 502 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 502, sequentially or otherwise, that specify actions to be taken by the machine 500. Further, while a single machine 500 is illustrated, the term "machine" shall also be taken to include a collection of machines that individually or jointly execute the instructions 502 to perform any one or more of the methodologies discussed herein. The machine 500, for example, may comprise the user system 102 or any one of multiple server devices forming part of the server system 110. In some examples, the machine 500 may also comprise both client and server systems, with certain operations of a particular method or algorithm being performed on the server-side and with certain operations of the method or algorithm being performed on the client-side.

The machine 500 may include processors 504, memory 506, and input/output I/O components 508, which may be configured to communicate with each other via a bus 510.

The memory 506 includes a main memory 516, a static memory 518, and a storage unit 520, both accessible to the processors 504 via the bus 510. The main memory 506, the static memory 518, and storage unit 520 store the instructions 502 embodying any one or more of the methodologies or functions described herein. The instructions 502 may also reside, completely or partially, within the main memory 516, within the static memory 518, within machine-readable medium 522 within the storage unit 520, within at least one of the processors 504 (e.g., within the processor's cache memory), or any suitable combination thereof, during execution thereof by the machine 500.

The I/O components 508 may include a wide variety of components to receive input, provide output, produce output, transmit information, exchange information, capture measurements, and so on. The specific I/O components 508 that are included in a particular machine will depend on the type of machine. For example, portable machines such as mobile phones may include a touch input device or other such input mechanisms, while a headless server machine will likely not include such a touch input device. It will be appreciated that the I/O components 508 may include many other components that are not shown in FIG. 5. In various examples, the I/O components 508 may include user output components 524 and user input components 526. The user output components 524 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

The motion components 530 include acceleration sensor components (e.g., accelerometer), gravitation sensor components, rotation sensor components (e.g., gyroscope).

The environmental components 532 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be modified with digital effect data (e.g., filters) described above. The rear cameras may, for example, be used to capture still images and videos in a more traditional camera mode, with these images similarly being modified with digital effect data. In addition to front and rear cameras, the user system 102 may also include a 360° camera for capturing 360° photographs and videos.

Moreover, the camera system of the user system 102 may be equipped with advanced multi-camera configurations. This may include dual rear cameras, which might consist of a primary camera for general photography and a depth-sensing camera for capturing detailed depth information in a scene. This depth information can be used for various purposes, such as creating a bokeh effect in portrait mode, where the subject is in sharp focus while the background is blurred. In addition to dual camera setups, the user system 102 may also feature triple, quad, or even penta camera configurations on both the front and rear sides of the user system 102. These multiple cameras systems may include a wide camera, an ultra-wide camera, a telephoto camera, a macro camera, and a depth sensor, for example.

Communication may be implemented using a wide variety of technologies. The I/O components 508 further include communication components 536 operable to couple the machine 500 to a network 538 or devices 540 via respective coupling or connections. For example, the communication components 536 may include a network interface component or another suitable device to interface with the network 538. In further examples, the communication components 536 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 540 may be another machine or any of a wide variety of peripheral devices (e.g., a peripheral device coupled via a USB).

Moreover, the communication components 536 may detect identifiers or include components operable to detect identifiers. For example, the communication components 536 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 536, such as location via Internet Protocol (IP) geolocation, location via Wi-Fi® signal triangulation, location via detecting an NFC beacon signal that may indicate a particular location, and so forth.

The various memories (e.g., main memory 516, static memory 518, and memory of the processors 504) and storage unit 520 may store one or more sets of instructions and data structures (e.g., software) embodying or used by any one or more of the methodologies or functions described herein. These instructions (e.g., the instructions 502), when executed by processors 504, cause various operations to implement the disclosed examples.

The instructions 502 may be transmitted or received over the network 538, using a transmission medium, via a network interface device (e.g., a network interface component included in the communication components 536) and using any one of several well-known transfer protocols (e.g., hypertext transfer protocol (HTTP)). Similarly, the instructions 502 may be transmitted or received using a transmission medium via a coupling (e.g., a peer-to-peer coupling) to the devices 540.

Software Architecture

Figure 6:
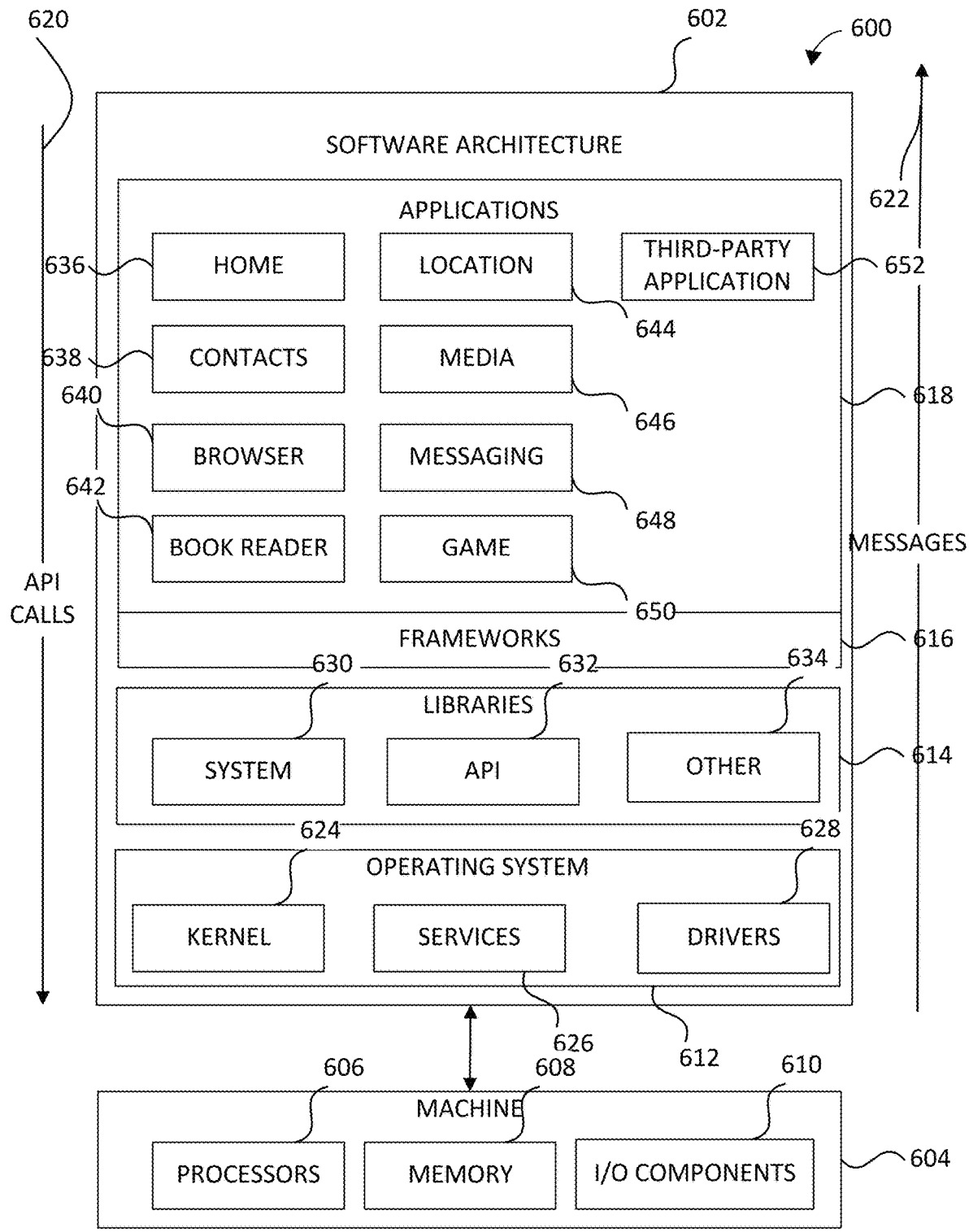
FIG. 6 is a block diagram depicting the software architecture of a computing device, showing various applications, frameworks, and system components, consistent with some embodiments.

FIG. 6 is a block diagram 600 illustrating a software architecture 602, which can be installed on any one or more of the devices described herein. The software architecture 602 is supported by hardware such as a machine 604 that includes processors 606, memory 608, and I/O components 610. In this example, the software architecture 602 can be conceptualized as a stack of layers, where each layer provides a particular functionality. The software architecture 602 includes layers such as an operating system 612, libraries 614, frameworks 616, and applications 618. Operationally, the applications 618 invoke API calls 620 through the software stack and receive messages 622 in response to the API calls 620.

The operating system 612 manages hardware resources and provides common services. The operating system 612 includes, for example, a kernel 624, services 626, and drivers 628. The kernel 624 acts as an abstraction layer between the hardware and the other software layers. For example, the kernel 624 provides memory management, processor management (e.g., scheduling), component management, networking, and security settings, among other functionalities. The services 626 can provide other common services for the other software layers. The drivers 628 are responsible for controlling or interfacing with the underlying hardware. For instance, the drivers 628 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 614 provide a common low-level infrastructure used by the applications 618. The libraries 614 can include system libraries 630 (e.g., C standard library) that provide functions such as memory allocation functions, string manipulation functions, mathematical functions, and the like. In addition, the libraries 614 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 614 can also include a wide variety of other libraries 634 to provide many other APIs to the applications 618.

The frameworks 616 provide a common high-level infrastructure that is used by the applications 618. For example, the frameworks 616 provide various graphical user interface (GUI) functions, high-level resource management, and high-level location services. The frameworks 616 can provide a broad spectrum of other APIs that can be used by the applications 618, some of which may be specific to a particular operating system or platform.

In an example, the applications 618 may include a home application 636, a contacts application 638, a browser application 640, a book reader application 642, a location application 644, a media application 646, a messaging application 648, a game application 650, and a broad assortment of other applications such as a third-party application 652. The applications 618 are programs that execute functions defined in the programs. Various programming languages can be employed to create one or more of the applications 618, structured in a variety of manners, such as object-oriented programming languages (e.g., Objective-C, Java, or C++) or procedural programming languages (e.g., C or assembly language). In a specific example, the third-party application 652 (e.g., an application developed using the ANDROID™ or IOS™ software development kit (SDK) by an entity other than the vendor of a platform) may be mobile software running on a mobile operating system such as IOS™, ANDROID™, WINDOWS® Phone, or another mobile operating system. In this example, the third-party application 652 can invoke the API calls 620 provided by the operating system 612 to facilitate functionalities described herein.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to."

As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any portions of this application. Where the context permits, words using the singular or plural number may also include the plural or singular number respectively.

The word "or" in reference to a list of two or more items, covers all the following interpretations of the word: any one of the items in the list, all the items in the list, and any combination of the items in the list. Likewise, the term "and/or" in reference to a list of two or more items, covers all the following interpretations of the word: any one of the items in the list, all the items in the list, and any combination of the items in the list.

The various features, operations, or processes described herein may be used independently of one another, or may be combined in various ways. All possible combinations and sub-combinations are intended to fall within the scope of this disclosure. In addition, certain method or process blocks may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

EXAMPLES

Example 1 is a head-wearable apparatus for improving user interactions with virtual interface elements in an augmented reality (AR) environment, the head-wearable apparatus comprising: a display component; one or more processors; one or more image sensors; a memory storing instructions thereon, which, when executed by the one or more processors, cause the head-wearable apparatus to perform operations comprising: detecting a hand movement in a three-dimensional (3D) space; tracking a velocity vector and a position of a finger of the hand; identifying one or more virtual interface elements within a predetermined proximity of the finger in the 3D space; for each identified virtual interface element: determining a UI-to-finger vector between the virtual interface element and the finger; calculating an alignment between the velocity vector of the finger and the UI-to-finger vector; dynamically adjusting a size of an interaction zone of the virtual interface element based on the calculated alignment and a magnitude of the velocity vector of the finger; evaluating a consistency between the velocity vector of the finger and relative locations of the virtual interface elements; predicting a target virtual interface element based on the evaluated consistency; and triggering an interaction with the predicted target virtual interface element when the finger enters the dynamically adjusted interaction zone of the predicted target virtual interface element.

In Example 2, the subject matter of Example 1 includes, wherein tracking the velocity vector and position of the finger comprises: capturing multiple images of the user's hand over time using the one or more image sensors; performing landmark detection on the captured images to identify key points of the hand including fingertips; analyzing changes in position of the fingertip landmark across multiple frames to determine the velocity vector; and calculating the UI-to-finger vector from a center point of each virtual interface element to the current position of the fingertip landmark.

In Example 3, the subject matter of Examples 1-2 includes, wherein calculating the alignment between the velocity vector of the finger and the UI-to-finger vector comprises: normalizing the velocity vector and the UI-to-finger vector; calculating a dot product of the normalized vectors to obtain a scalar alignment value; and determining a final alignment score based on a weighted sum of the dot product, a magnitude of the velocity vector, and a distance between the finger and the virtual interface element.

In Example 4, the subject matter of Examples 1-3 includes, wherein dynamically adjusting the size of the interaction zone comprises: increasing the size of the interaction zone for virtual interface elements having an alignment score exceeding a first predetermined threshold and a velocity magnitude exceeding a second predetermined threshold.

In Example 5, the subject matter of Examples 1-4 includes, wherein dynamically adjusting the size of the interaction zone comprises: decreasing or maintaining a size for the interaction zone of virtual interface elements having an alignment score below a first predetermined threshold or a velocity magnitude below a second predetermined threshold.

In Example 6, the subject matter of Examples 1-5 includes, wherein the operations further comprise: applying smoothing and clamping techniques to data used in deriving the velocity vector to reduce noise and ensure consistent tracking, wherein i) smoothing comprises applying a filter to average out rapid fluctuations in the velocity data, and ii) clamping comprises setting upper and lower limits on velocity values to prevent extreme or unrealistic readings from affecting the interaction.

In Example 7, the subject matter of Examples 1-6 includes, wherein the operations further comprise: detecting movement of the head-wearable apparatus using motion and position components; adjusting perceived positions of the virtual interface elements and the user's hand based on the detected movement; and updating the velocity vector and UI-to-finger vector calculations to maintain accuracy during user interaction.

In Example 8, the subject matter of Examples 1-7 includes, wherein evaluating the consistency between the velocity vector of the finger and relative locations of the virtual interface elements comprises: analyzing the magnitude of the velocity vector over a predetermined time period to classify finger movements into at least two categories: slow movements, defined as movements with a velocity magnitude below a first predetermined threshold; and fast movements, defined as movements with a velocity magnitude above a second predetermined threshold; for slow movements, requiring the alignment between the velocity vector and the UI-to-finger vector to exceed a third predetermined threshold before expanding the interaction zone; and for fast movements, expanding the interaction zone when the alignment between the velocity vector and the UI-to-finger vector exceeds a fourth predetermined threshold, wherein the fourth predetermined threshold is lower than the third predetermined threshold.

In Example 9, the subject matter of Examples 1-8 includes, wherein the virtual interface elements comprise three-dimensional objects in an augmented reality environment, and wherein the operations further comprise: dynamically adjusting interaction zones for the three-dimensional objects based on the calculated alignment and velocity magnitude; predicting user intent for interacting with specific three-dimensional objects; and filtering out unintended interactions with objects that are not in the path of the movement of the finger.

Example 10 is a method, performed by a head-wearable apparatus, the method comprising: detecting a hand movement in a three-dimensional (3D) space; tracking a velocity vector and a position of a finger of the hand; identifying one or more virtual interface elements within a predetermined proximity of the finger in the 3D space; for each identified virtual interface element: determining a UI-to-finger vector between the virtual interface element and the finger; calculating an alignment between the velocity vector of the finger and the UI-to-finger vector; dynamically adjusting a size of an interaction zone of the virtual interface element based on the calculated alignment and a magnitude of the velocity vector of the finger; evaluating a consistency between the velocity vector of the finger and relative locations of the virtual interface elements; predicting a target virtual interface element based on the evaluated consistency; and triggering an interaction with the predicted target virtual interface element when the finger enters the dynamically adjusted interaction zone of the predicted target virtual interface element.

In Example 11, the subject matter of Example 10 includes, wherein tracking the velocity vector and position of the finger comprises: capturing multiple images of the user's hand over time using the one or more image sensors; performing landmark detection on the captured images to identify key points of the hand including fingertips; analyzing changes in position of the fingertip landmark across multiple frames to determine the velocity vector; and calculating the UI-to-finger vector from a center point of each virtual interface element to the current position of the fingertip landmark.

In Example 12, the subject matter of Examples 10-11 includes, wherein calculating the alignment between the velocity vector of the finger and the UI-to-finger vector comprises: normalizing the velocity vector and the UI-to-finger vector; calculating a dot product of the normalized vectors to obtain a scalar alignment value; and determining a final alignment score based on a weighted sum of the dot product, a magnitude of the velocity vector, and a distance between the finger and the virtual interface element.

In Example 13, the subject matter of Examples 10-12 includes, wherein dynamically adjusting the size of the interaction zone comprises: increasing the size of the interaction zone for virtual interface elements having an alignment score exceeding a first predetermined threshold and a velocity magnitude exceeding a second predetermined threshold.

In Example 14, the subject matter of Examples 10-13 includes, wherein dynamically adjusting the size of the interaction zone comprises: decreasing or maintaining a size for the interaction zone of virtual interface elements having an alignment score below a first predetermined threshold or a velocity magnitude below a second predetermined threshold.

In Example 15, the subject matter of Examples 10-14 includes, wherein the operations further comprise: applying smoothing and clamping techniques to data used in deriving the velocity vector to reduce noise and ensure consistent tracking, wherein i) smoothing comprises applying a filter to average out rapid fluctuations in the velocity data, and ii) clamping comprises setting upper and lower limits on velocity values to prevent extreme or unrealistic readings from affecting the interaction.

In Example 16, the subject matter of Examples 10-15 includes, wherein the operations further comprise: detecting movement of the head-wearable apparatus using motion and position components; adjusting perceived positions of the virtual interface elements and the user's hand based on the detected movement; and updating the velocity vector and UI-to-finger vector calculations to maintain accuracy during user interaction.

In Example 17, the subject matter of Examples 10-16 includes, wherein evaluating the consistency between the velocity vector of the finger and relative locations of the virtual interface elements comprises: analyzing the magnitude of the velocity vector over a predetermined time period to classify finger movements into at least two categories: slow movements, defined as movements with a velocity magnitude below a first predetermined threshold; and fast movements, defined as movements with a velocity magnitude above a second predetermined threshold; for slow movements, requiring the alignment between the velocity vector and the UI-to-finger vector to exceed a third predetermined threshold before expanding the interaction zone; and for fast movements, expanding the interaction zone when the alignment between the velocity vector and the UI-to-finger vector exceeds a fourth predetermined threshold, wherein the fourth predetermined threshold is lower than the third predetermined threshold.

In Example 18, the subject matter of Examples 10-17 includes, wherein the virtual interface elements comprise three-dimensional objects in an augmented reality environment, and wherein the operations further comprise: dynamically adjusting interaction zones for the three-dimensional objects based on the calculated alignment and velocity magnitude; predicting user intent for interacting with specific three-dimensional objects; and filtering out unintended interactions with objects that are not in the path of the movement of the finger.

Example 19 is a head-wearable apparatus for improving user interactions with virtual interface elements in an augmented reality (AR) environment, the head-wearable apparatus comprising: means for detecting a hand movement in a three-dimensional (3D) space; means for tracking a velocity vector and a position of a finger of the hand; means for identifying one or more virtual interface elements within a predetermined proximity of the finger in the 3D space; for each identified virtual interface element: means for determining a UI-to-finger vector between the virtual interface element and the finger; means for calculating an alignment between the velocity vector of the finger and the UI-to-finger vector; means for dynamically adjusting a size of an interaction zone of the virtual interface element based on the calculated alignment and a magnitude of the velocity vector of the finger; means for evaluating a consistency between the velocity vector of the finger and relative locations of the virtual interface elements; means for predicting a target virtual interface element based on the evaluated consistency; and means for triggering an interaction with the predicted target virtual interface element when the finger enters the dynamically adjusted interaction zone of the predicted target virtual interface element.

In Example 20, the subject matter of Examples 1-19 includes, wherein tracking the velocity vector and position of the finger comprises: capturing multiple images of the user's hand over time using the one or more image sensors; performing landmark detection on the captured images to identify key points of the hand including fingertips; analyzing changes in position of the fingertip landmark across multiple frames to determine the velocity vector; and calculating the UI-to-finger vector from a center point of each virtual interface element to the current position of the fingertip landmark.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

GLOSSARY

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components, also referred to as "computer-implemented." Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A head-wearable apparatus for improving user interactions with virtual interface elements in an augmented reality (AR) environment, the head-wearable apparatus comprising:
   a display component;
   one or more processors;
   one or more image sensors;
   a memory storing instructions thereon, which, when executed by the one or more processors, cause the head-wearable apparatus to perform operations comprising:
   detecting a hand movement in a three-dimensional (3D) space;
   tracking a velocity vector and a position of a finger of the hand;
   identifying one or more virtual interface elements within a predetermined proximity of the finger in the 3D space;
   for each identified virtual interface element:
      determining a UI-to-finger vector between the virtual interface element and the finger;
      calculating an alignment between the velocity vector of the finger and the UI-to-finger vector; and
      dynamically adjusting a size of an interaction zone of the virtual interface element based on the calculated alignment and a magnitude of the velocity vector of the finger;
   evaluating a consistency between the velocity vector of the finger and relative locations of the virtual interface elements;
   predicting a target virtual interface element based on the evaluated consistency; and
   triggering an interaction with the predicted target virtual interface element when the finger enters the dynamically adjusted interaction zone of the predicted target virtual interface element.

2. The head-wearable apparatus of claim 1, wherein tracking the velocity vector and position of the finger comprises:
   capturing multiple images of the user's hand over time using the one or more image sensors;
   performing landmark detection on the captured images to identify key points of the hand including fingertips;
   analyzing changes in position of the fingertip landmark across multiple frames to determine the velocity vector; and
   calculating the UI-to-finger vector from a center point of each virtual interface element to the current position of the fingertip landmark.

3. The head-wearable apparatus of claim 1, wherein calculating the alignment between the velocity vector of the finger and the UI-to-finger vector comprises:
   normalizing the velocity vector and the UI-to-finger vector;
   calculating a dot product of the normalized vectors to obtain a scalar alignment value; and
   determining a final alignment score based on a weighted sum of the dot product, a magnitude of the velocity vector, and a distance between the finger and the virtual interface element.

4. The head-wearable apparatus of claim 1, wherein dynamically adjusting the size of the interaction zone comprises:
   increasing the size of the interaction zone for virtual interface elements having an alignment score exceeding a first predetermined threshold and a velocity magnitude exceeding a second predetermined threshold.

5. The head-wearable apparatus of claim 1, wherein dynamically adjusting the size of the interaction zone comprises:
   decreasing or maintaining a size for the interaction zone of virtual interface elements having an alignment score below a first predetermined threshold or a velocity magnitude below a second predetermined threshold.

6. The head-wearable apparatus of claim 1, wherein the operations further comprise:
   applying smoothing and clamping techniques to data used in deriving the velocity vector to reduce noise and ensure consistent tracking, wherein i) smoothing comprises applying a filter to average out rapid fluctuations in the velocity data, and ii) clamping comprises setting upper and lower limits on velocity values to prevent extreme or unrealistic readings from affecting the interaction.

7. The head-wearable apparatus of claim 1, wherein the operations further comprise:
   detecting movement of the head-wearable apparatus using motion and position components;
   adjusting perceived positions of the virtual interface elements and the user's hand based on the detected movement; and
   updating the velocity vector and UI-to-finger vector calculations to maintain accuracy during user interaction.

8. The head-wearable apparatus of claim 1, wherein evaluating the consistency between the velocity vector of the finger and relative locations of the virtual interface elements comprises:
   analyzing the magnitude of the velocity vector over a predetermined time period to classify finger movements into at least two categories:
   slow movements, defined as movements with a velocity magnitude below a first predetermined threshold; and
   fast movements, defined as movements with a velocity magnitude above a second predetermined threshold;
   for slow movements, requiring the alignment between the velocity vector and the UI-to-finger vector to exceed a third predetermined threshold before expanding the interaction zone; and
   for fast movements, expanding the interaction zone when the alignment between the velocity vector and the UI-to-finger vector exceeds a fourth predetermined threshold, wherein the fourth predetermined threshold is lower than the third predetermined threshold.

9. The head-wearable apparatus of claim 1, wherein the virtual interface elements comprise three-dimensional objects in an augmented reality environment, and wherein the operations further comprise:
   dynamically adjusting interaction zones for the three-dimensional objects based on the calculated alignment and velocity magnitude;
   predicting user intent for interacting with specific three-dimensional objects; and
   filtering out unintended interactions with objects that are not in the path of the movement of the finger.

10. A method, performed by a head-wearable apparatus, the method comprising:

detecting a hand movement in a three-dimensional (3D) space;

tracking a velocity vector and a position of a finger of the hand;

identifying one or more virtual interface elements within a predetermined proximity of the finger in the 3D space;

for each identified virtual interface element:
  determining a UI-to-finger vector between the virtual interface element and the finger;
  calculating an alignment between the velocity vector of the finger and the UI-to-finger vector; and
  dynamically adjusting a size of an interaction zone of the virtual interface element based on the calculated alignment and a magnitude of the velocity vector of the finger;

evaluating a consistency between the velocity vector of the finger and relative locations of the virtual interface elements;

predicting a target virtual interface element based on the evaluated consistency; and triggering an interaction with the predicted target virtual interface element when the finger enters the dynamically adjusted interaction zone of the predicted target virtual interface element.

11. The method of claim 10, wherein tracking the velocity vector and position of the finger comprises:
  capturing multiple images of the user's hand over time using one or more image sensors;
  performing landmark detection on the captured images to identify key points of the hand including fingertips;
  analyzing changes in position of the fingertip landmark across multiple frames to determine the velocity vector; and
  calculating the UI-to-finger vector from a center point of each virtual interface element to the current position of the fingertip landmark.

12. The method of claim 10, wherein calculating the alignment between the velocity vector of the finger and the UI-to-finger vector comprises:
  normalizing the velocity vector and the UI-to-finger vector;
  calculating a dot product of the normalized vectors to obtain a scalar alignment value; and
  determining a final alignment score based on a weighted sum of the dot product, a magnitude of the velocity vector, and a distance between the finger and the virtual interface element.

13. The method of claim 10, wherein dynamically adjusting the size of the interaction zone comprises:
  increasing the size of the interaction zone for virtual interface elements having an alignment score exceeding a first predetermined threshold and a velocity magnitude exceeding a second predetermined threshold.

14. The method of claim 10, wherein dynamically adjusting the size of the interaction zone comprises:
  decreasing or maintaining a size for the interaction zone of virtual interface elements having an alignment score below a first predetermined threshold or a velocity magnitude below a second predetermined threshold.

15. The method of claim 10, further comprising:
  applying smoothing and clamping techniques to data used in deriving the velocity vector to reduce noise and ensure consistent tracking, wherein i) smoothing comprises applying a filter to average out rapid fluctuations in the velocity data, and ii) clamping comprises setting upper and lower limits on velocity values to prevent extreme or unrealistic readings from affecting the interaction.

16. The method of claim 10, further comprising:
  detecting movement of the head-wearable apparatus using motion and position components;
  adjusting perceived positions of the virtual interface elements and the user's hand based on the detected movement; and
  updating the velocity vector and UI-to-finger vector calculations to maintain accuracy during user interaction.

17. The method of claim 10, wherein evaluating the consistency between the velocity vector of the finger and relative locations of the virtual interface elements comprises:
  analyzing the magnitude of the velocity vector over a predetermined time period to classify finger movements into at least two categories:
    slow movements, defined as movements with a velocity magnitude below a first predetermined threshold; and
    fast movements, defined as movements with a velocity magnitude above a second predetermined threshold;
  for slow movements, requiring the alignment between the velocity vector and the UI-to-finger vector to exceed a third predetermined threshold before expanding the interaction zone; and
  for fast movements, expanding the interaction zone when the alignment between the velocity vector and the UI-to-finger vector exceeds a fourth predetermined threshold, wherein the fourth predetermined threshold is lower than the third predetermined threshold.

18. The method of claim 10, wherein the virtual interface elements comprise three-dimensional objects in an augmented reality environment, and wherein the method further comprises:
  dynamically adjusting interaction zones for the three-dimensional objects based on the calculated alignment and velocity magnitude;
  predicting user intent for interacting with specific three-dimensional objects; and
  filtering out unintended interactions with objects that are not in the path of the movement of the finger.

19. A processor for improving user interactions with virtual interface elements in an augmented reality (AR) environment, the processor configured to perform operations comprising:
  detecting hand movement in a three-dimensional (3D) space;
  tracking a velocity vector and a position of a finger of the hand;
  identifying one or more virtual interface elements within a predetermined proximity of the finger in the 3D space;
  for each identified virtual interface element:
    determining a UI-to-finger vector between the virtual interface element and the finger;
    calculating an alignment between the velocity vector of the finger and the UI-to-finger vector; and
    dynamically adjusting a size of an interaction zone of the virtual interface element based on the calculated alignment and a magnitude of the velocity vector of the finger;
  evaluating a consistency between the velocity vector of the finger and relative locations of the virtual interface elements,
  predicting a target virtual interface element based on the evaluated consistency; and triggering an interaction with the predicted target virtual interface element when the finger enters the dynamically adjusted interaction zone of the predicted target virtual interface element.

20. The processor of claim 19, wherein tracking the velocity vector and position of the finger comprises:
capturing multiple images of the user's hand over time using the one or more image sensors;
performing landmark detection on the captured images to identify key points of the hand including fingertips;
analyzing changes in position of the fingertip landmark across multiple frames to determine the velocity vector; and
calculating the UI-to-finger vector from a center point of each virtual interface element to the current position of the fingertip landmark.

* * * * *